United States Patent [19]

Stephenson

[11] Patent Number: 5,406,343

[45] Date of Patent: Apr. 11, 1995

[54] ALTERNATIVE DIRECT AND COMBINED DIRECT-INDIRECT LIGHT REFLECTING DEVICE

[75] Inventor: Stanley W. Stephenson, Rochester, N.Y.

[73] Assignee: Eastman Kodak Company, Rochester, N.Y.

[21] Appl. No.: 180,591

[22] Filed: Jan. 13, 1994

[51] Int. Cl.6 .......................................... G03B 15/03
[52] U.S. Cl. ............................ 354/126; 354/149.1; 354/149.11
[58] Field of Search ............. 354/126, 149.1, 149.11; 362/16–18

[56] References Cited

U.S. PATENT DOCUMENTS

| | | | |
|---|---|---|---|
| 3,204,542 | 9/1965 | Strasser et al. | 354/126 |
| 3,821,764 | 6/1974 | Shelton | 354/126 |
| 3,869,604 | 3/1975 | Prochnow | 354/126 X |
| 4,085,316 | 4/1978 | Quinn | 362/16 |
| 4,122,333 | 10/1978 | Crouse | 362/18 |
| 4,333,127 | 6/1982 | Alkema et al. | 362/17 |
| 4,470,103 | 9/1984 | Krieg | 362/17 |
| 4,893,140 | 1/1990 | Yamamoto et al. | 354/149.11 |
| 4,897,680 | 1/1990 | Lo | 354/149.11 X |
| 4,910,542 | 3/1990 | Yamamoto et al. | 354/149.11 |
| 5,126,778 | 6/1992 | Wheeler et al. | 354/149.1 X |

Primary Examiner—Michael L. Gellner
Assistant Examiner—J. K. Han
Attorney, Agent, or Firm—Roger A. Fields

[57] ABSTRACT

A main light reflector is supported for movement between a direct flash position for reflecting light output from a source of flash illumination directly towards a subject to be photographed and an indirect flash position for reflecting light output from the flash source onto a nearby surface and thence directly towards a subject to be photographed. A supplementary light reflector is supported for movement to a direct flash position for reflecting light output from the flash source directly towards a subject to be photographed. The supplementary reflector is moved to its direct flash position in response to movement of the main reflector to its indirect flash position, whereby combined direct and indirect illumination of a subject to be photographed can be achieved.

5 Claims, 2 Drawing Sheets

ALTERNATIVE DIRECT AND COMBINED DIRECT-INDIRECT LIGHT REFLECTING DEVICE

FIELD OF THE INVENTION

This invention relates generally to the field of photography, and in particular to a reflective device for use with a source of flash illumination for illuminating a subject to be photographed. More specifically, the invention relates to an alternative direct and combined direct-indirect light reflecting device.

BACKGROUND OF THE INVENTION

It is conventional today to use a source of flash illumination with a camera during picture-taking in low light conditions. Typically, a flash reflector is located on the camera in a direct flash position for reflecting light output from the source of flash illumination directly or nearly directly towards a subject to be photographed. The flash reflector may be pivotable from its direct flash position to an indirect or bounce flash position for reflecting light output from the source of flash illumination towards a nearby surface such as a ceiling and thence directly towards the subject.

Prior art U.S. Pat. No. 4,085,316, issued Apr. 18, 1978, U.S. Pat. No. 4,122,333, issued Oct. 24, 1978, and U.S. Pat. No. 4,470,103, issued Sep. 4, 1984, each suggest that more pleasing photographs can be obtained in low light conditions when there is simultaneous direct and bounce flash illumination of the subject. For example, in the '333 patent there is disclosed a reflective device for providing either bounce flash illumination or simultaneous direct and bounce flash illumination, and in the '103 patent there is disclosed a reflective device for providing either direct flash illumination or simultaneous direct and bounce flash illumination. Conversely, in the '316 patent there is disclosed a light diffusing device for providing only simultaneous direct and bounce flash illumination.

PROBLEM(S) TO BE SOLVED BY THE INVENTION

Clearly, it is advantageous to alternatively provide direct flash illumination and combined direct and bounce flash illumination as in the '103 patent, rather than to alternatively provide bounce flash illumination and combined direct and bounce flash illumination as in the '333 patent, or to only provide combined direct and bounce flash illumination as in the '316 patent. However, in the '103 patent, when combined direct and bounce flash illumination is provided, a larger portion of an elliptical reflector must be separated from a smaller portion of the reflector to effect respective spaced portions of the reflector for the two types of flash illumination. This may result in a loss of some of the flash output due to the decreased efficiency of the reflector when it is separated into two parts.

SUMMARY OF THE INVENTION

According to the invention a reflective device to be used with a source of flash illumination for illuminating a subject to be photographed, comprises:

a main reflector supported for movement between a direct flash position for reflecting light output from a source of flash illumination directly towards a subject to be photographed and an indirect flash position for reflecting light output from a source of flash illumination onto a nearby surface and thence directly towards a subject to be photographed;

a supplementary reflector supported for movement to a direct flash position for reflecting light output from a source of flash illumination directly towards a subject to be photographed; and means mounting the supplementary reflector for movement to its direct flash position in response to movement of the main reflector to its indirect flash position, whereby combined direct and indirect illumination of a subject to be photographed can be achieved.

ADVANTAGEOUS EFFECT(S) OF THE INVENTION

The invention more efficiently produces light output as compared to the two-part reflector disclosed in the '103 patent.

DETAILED DESCRIPTION OF THE INVENTION

The invention is disclosed as being embodied preferably in an electronic flash unit built into a non single-lens reflex (NSLR) 35 mm camera. Because the features of this type of flash unit are generally known, the description which follows is directed in particular only to those elements forming part of or cooperating directly with the disclosed embodiment. It is to be understood, however, that other elements not disclosed may take various forms known to a person of ordinary skill in the art.

Figure 1:
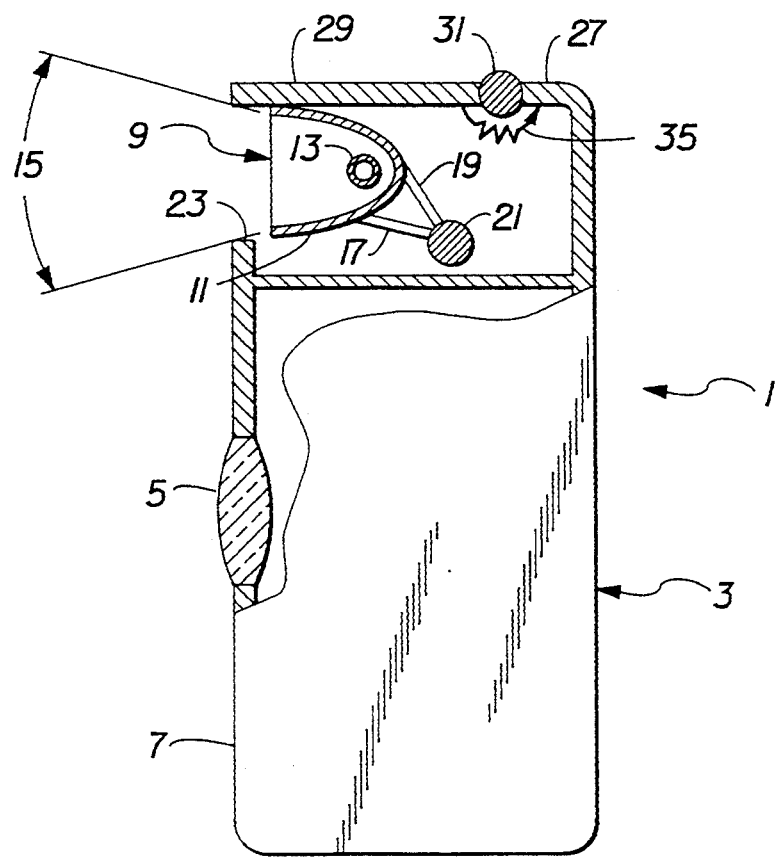
FIG. 1 is a side elevation view partly in section of an alternative direct and combined direct-indirect light reflecting device according to a preferred embodiment of the invention, showing the light reflecting device in a direct reflecting mode of operation.
Figure 2:
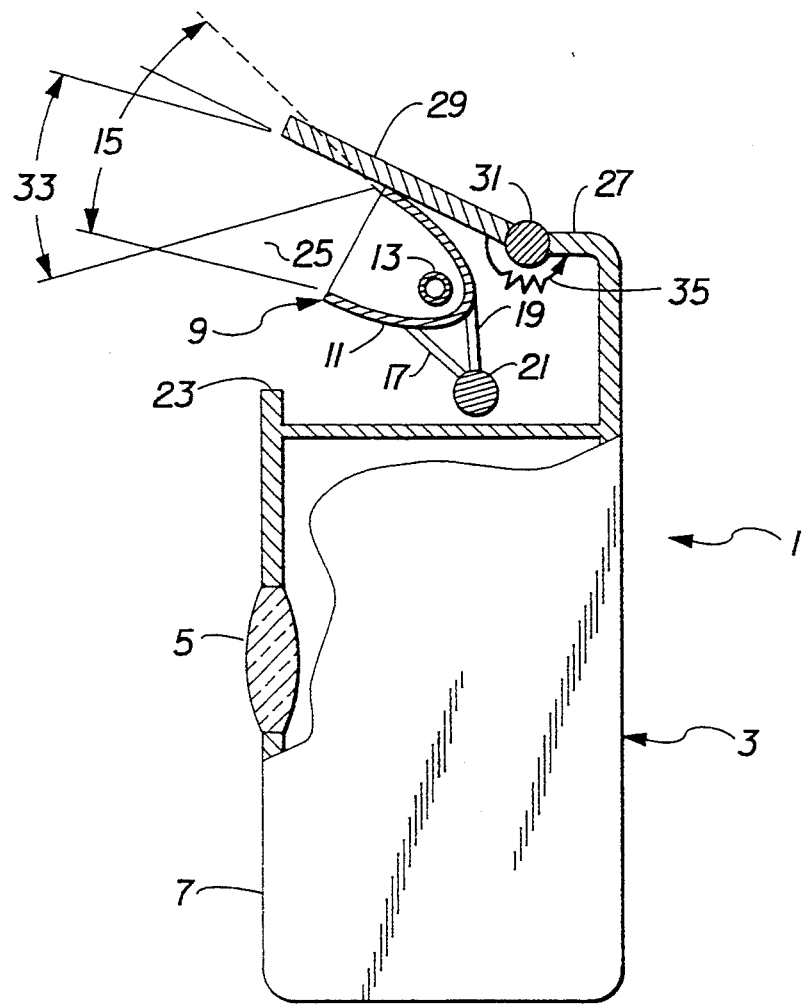
FIG. 2 is a side elevation view partly in section similar to FIG. 1, showing the light reflecting device in a combined direct-indirect reflecting mode of operation.

Referring now to the drawings, FIGS. 1 and 2 depict a NSLR 35 mm camera 1 having a housing or body 3 and a taking lens 5 mounted within an opening in a front wall 7 of the housing. A conventional electronic flash unit 9 is located inside the housing 3 and includes a silvered, nominally parabolic, reflector 11 and a flash tube 13 mounted within the reflector. Other components of the flash unit 9, not shown, include a power supply, a capacitor, and a triggering circuit. A known flash circuit is disclosed in U.S. Pat. No. 4,893,140, issued Jan. 9, 1990. The reflector 11 concentrates light output from the flash tube 13 to provide a beam of flash illumination which diverges over a limited angle, i.e. a spread zone, 15 that covers the viewing angle of the taking lens 5.

The reflector 11 is fixed to a pair of arms 17 and 19 which, in turn, are fixed to a shaft 21 pivotally supported by respective side extensions, not shown, of the housing 3. This arrangement permits the reflector 11 with the flash tube 13 to be swung, when the shaft 21 is pivoted, between a direct flash position shown in FIG. 1 and an indirect or bounce flash position shown in FIG. 2. In its direct flash position, the reflector 11 reflects light output from the flash tube 13 through a front opening or window 23 in the front wall 7 of the housing 3 directly or nearly directly towards a subject to be photographed. In its indirect or bounce flash position, the reflector 11 protrudes through a top opening 25 in a top wall 27 of the housing 3 to reflect light output from the flash tube 13 onto a nearby surface such as a ceiling and thence directly to the subject to be photographed.

A supplementary, silvered, nominally plano (or slightly curved) reflector 29 is fixed to a shaft 31 pivotally supported by the top wall 27 of the housing 3 for movement between an original or normal position shown in FIG. 1 and a direct flash position shown in FIG. 2. In its original position, the supplementary reflector 29 covers the top opening 25 in the top wall 27 of the housing 3 without protruding into the spread zone 15 of the reflector 11. In its direct flash position, the supplementary reflector 29 uncovers the top opening 25 and protrudes slightly, for example 15 degrees, into the spread zone 15 of the reflector 11 to direct light output, for example 20%, from the flash tube 13 directly towards the subject to be photographed as indicated by a reflection zone 33 of the supplementary reflector. Thus, as shown in FIG. 2, when the reflector 11 is in its indirect or bounce flash position and the supplementary reflector 29 is in its direct flash position, combined direct and indirect illumination of the subject is provided.

A tension spring 35 urges the supplementary reflector 29 to its original position as shown in FIG. 1. However, when the reflector 11 is moved from its direct flash position to its indirect or bounce flash position as shown in FIG. 2, it pushes against the supplementary reflector 29 to automatically raise the supplementary reflector 29 from its original position to its direct flash position. This is possible because as shown in FIG. 1 the reflector 11 is mounted via the pivot shaft 21 in contact with the reflector 29 which is mounted via the pivot shaft 21, to cause clockwise pivoting of the reflector 11 to similarly pivot the reflector 29 as shown in FIG. 2.

The invention has been described with reference to a preferred embodiment. However, it will be appreciated that variations and modifications can be effected by a person of ordinary skill in the art without departing from the scope of the invention. For example, the reflector 11 with the flash tube 13 and the supplementary reflector 29 can be a separable unit that is attached to a camera, rather than an integral unit of the camera. Also, the shaft 31 can be supported for displacement to vary the number of degrees the supplementary reflector 29 will protrude into the spread zone 15 of the reflector 11 when the supplementary reflector is in its direct flash position and the other reflector is in its indirect or bounce flash position.

PARTS LIST FOR FIGS, 1–2

1. camera
3. housing
5. taking lens
7. front wall
9. electronic flash unit
11. parabolic reflector
13. flash tube
15. spread zone
17. and 19. arms
21. shaft
23. front opening
25. top opening
27. top wall
29. supplementary reflector
31. shaft
33. reflection zone
35. tension spring

What is claimed is:

1. A reflective device to be used with a source of flash illumination for illuminating a subject to be photographed, comprising:
    a main reflector supported for movement between a direct flash position for reflecting light output from a source of flash illumination directly towards a subject to be photographed and an indirect flash position for reflecting light output from a source of flash illumination onto a nearby surface and thence directly towards a subject to be photographed;
    a supplementary reflector supported for movement to a direct flash position for reflecting light output from a source of flash illumination directly towards a subject to be photographed; and
    means mounting said main and supplementary reflectors for moving the supplementary reflector to its direct flash position automatically in response to movement of the main reflector to its indirect flash position, whereby combined direct and indirect illumination of a subject to be photographed can be achieved.

2. A reflective device as recited in claim 1, wherein said main reflector is shaped to confine light output from a source of flash illumination to a predetermined zone, said supplementary reflector is arranged to protrude into the predetermined zone when the supplementary reflector is in its direct flash position, and said mounting means supports said supplementary reflector for movement to an original position removed from the predetermined zone.

3. A reflective device as recited in claim 2, wherein said mounting means includes means for urging said supplementary reflector to its original position responsive to movement of said main reflector to its direct flash position.

4. A reflective device as recited in claim 1, wherein a housing contains said main reflector when the main reflector is in its direct flash position and includes a top opening from which the main reflector protrudes when in its indirect flash position, and said supplementary reflector covers said top opening when the supplementary reflector is in its original position and uncovers the top opening when in its direct flash position.

5. A reflective device as recited in claim 1, wherein said mounting means arranges said main and supplementary reflectors to cause the main reflector to push against the supplementary reflector to move the supplementary reflector to its direct flash position automatically when the main reflector is moved to its indirect flash position.

* * * * *